US010749561B1

(12) United States Patent
Yuen et al.

(10) Patent No.: US 10,749,561 B1
(45) Date of Patent: Aug. 18, 2020

(54) HEADPHONE TRANSMITTING AND RECEIVING SIGNALS THROUGH A FEED PLATE ANTENNA WITH AN L-SHAPED PROBE

(71) Applicant: ACOUSTIC INNOVATION (HUIZHOU) CO. LTD, Huizhou, Guangdong (CN)

(72) Inventors: Chee Kit Yuen, Hong Kong (CN); Wai Yin Mung, Hong Kong (CN); Ka Ming Wu, Hong Kong (CN)

(73) Assignee: ACOUSTIC INNOVATION (HUIZHOU) CO. LTD., Guangdong (CN)

( * ) Notice: Subject to any disclaimer, the term of this patent is extended or adjusted under 35 U.S.C. 154(b) by 0 days.

(21) Appl. No.: 16/589,264

(22) Filed: Oct. 1, 2019

(51) Int. Cl.
  *H04B 1/40* (2015.01)
  *H04B 1/3827* (2015.01)
  *H01Q 1/24* (2006.01)
  *H04R 1/10* (2006.01)

(52) U.S. Cl.
  CPC ............ *H04B 1/385* (2013.01); *H01Q 1/24* (2013.01); *H04R 1/1041* (2013.01); *H04B 2001/3861* (2013.01); *H04R 2420/07* (2013.01)

(58) Field of Classification Search
  CPC .. H04B 1/385; H04B 2001/3861; H04B 1/04; H04B 1/40; H04B 1/03; H04B 1/08; H04B 2001/3872; H04M 1/6058; H01Q 1/24; H04R 2420/07
  See application file for complete search history.

(56) References Cited

U.S. PATENT DOCUMENTS

| 8,139,781 | B2* | 3/2012 | Cheng | H04R 1/1091 |
| | | | | 381/375 |
| 2001/0043157 | A1* | 11/2001 | Luk | H01Q 1/40 |
| | | | | 343/700 MS |
| 2009/0146883 | A1* | 6/2009 | Chin | H01Q 9/045 |
| | | | | 343/700 MS |
| 2015/0318601 | A1* | 11/2015 | Lin | H01Q 1/243 |
| | | | | 343/702 |
| 2017/0093039 | A1* | 3/2017 | Leung | H01Q 13/08 |
| 2017/0295420 | A1* | 10/2017 | Yeung | H04R 5/033 |
| 2018/0254640 | A1* | 9/2018 | Jung | H02J 7/0045 |
| 2019/0373353 | A1* | 12/2019 | Yuen | H04R 5/0335 |

* cited by examiner

*Primary Examiner* — Andrew Wendell
(74) *Attorney, Agent, or Firm* — Fitch, Even, Tabin & Flannery, LLP

(57) ABSTRACT

The utility model belongs to the technical field of headphones, and discloses a headphone transmitting and receiving signals through a feed plate antenna with an L-shaped probe, which comprises a wireless circuit board, a panel, a probe, a plate and a PCB. The bottom of the said PCB is provided with a wireless circuit board, the said PCB is electrically connected to the probe, the top of the said PCB is provided with a panel, and the other end of the said probe is electromagnetically coupled with the plate. The utility model may render different geometric shapes with respect to different designs, and its different characteristic designs may support multiple frequency bands, providing high directivity, so that the headphone product itself transmits and receives signals better. In addition, the antenna can be made part of the appearance, which enables the headphone product itself to transmit and receive signals better. As a result, the PCB has more space for circuit design because the antenna has become a part of the appearance.

5 Claims, 2 Drawing Sheets

HEADPHONE TRANSMITTING AND RECEIVING SIGNALS THROUGH A FEED PLATE ANTENNA WITH AN L-SHAPED PROBE

FIELD OF THE INVENTION

The utility model particularly relates to a headphone transmitting and receiving signals through a feed plate antenna with an L-shaped probe, and it belongs to the technical field of headphones.

BACKGROUND OF THE INVENTION

For a wireless headphone, its wires in the middle are replaced by radio waves. Audio signals are connected from an audio outlet of computer to a transmitting end, and then transmitted by the transmitting end to the headphone through radio wave. The receiving end is equivalent to a radio. A traditional wireless headphone antenna is hidden on a printed circuit board (PCB) in the casing, which not only affects the wireless headphone in receiving signal, but also weakens the aesthetics of the wireless headphone. Moreover, the headphone antenna occupies most of the space on the PCB.

Utility Model Content

The utility model is intended to solve technical problems and overcome existing drawbacks by providing a headphone that transmits and receives signals through a feed plate antenna with an L-shaped probe. It may render different geometric shapes with respect to different designs, and its different characteristic designs may support multiple frequency bands, providing high directivity, so that the headphone product itself transmits and receives signals better. In addition, the antenna can be made part of the appearance, which enables the headphone product itself transmit and receive signals better. As a result, the PCB has more space for circuit design because the antenna has become a part of the appearance, which effectively solves the problem in the background of the invention.

In order to solve the above technical problem, the utility model provides the following technical scheme:

The utility model provides a headphone transmitting and receiving signals through a feed plate antenna with an L-shaped probe, comprising a wireless circuit board, a panel, a probe, a plate and a PCB. The bottom of the said PCB is provided with a wireless circuit board, the said PCB is electrically connected to the probe, the top of the said PCB is provided with a panel, and the other end of the said probe is electromagnetically coupled with the plate.

As a preferred technical scheme of the utility model, the said probe has an L shape.

As a preferred technical scheme of the utility model, the headphone further includes a casing, and the said plate is fixed to the upper part of the casing.

As a preferred technical scheme of the utility model, the said wireless circuit board, panel, probe, plate, and PCB are all fixed inside the casing.

The utility model achieves a beneficial effect that the headphone transmitting and receiving signals through a feed plate antenna with a L-shaped probe may render different geometric shapes with respect to different designs, and its different characteristic designs support multiple frequency bands, providing high directivity, so that the headphone product itself transmits and receives signals better. In addition, the antenna can be made part of the appearance, which enables the headphone product itself to transmit and receive signals better. As a result, the PCB has more space for circuit design because the antenna has become a part of the appearance.

DRAWINGS

The drawings are intended to provide a further understanding of the utility model, to constitute a part of the specification of the utility model, and to explain the utility model together with the embodiments of the utility model, all of which do not constitute a limitation on the utility model.

NUMBERS IN THE DRAWING

1. Wireless circuit board; 2. Panel; 3. Probe; 4. Plate; 5. Casing; 6. PCB.

DETAILED DESCRIPTION OF THE PREFERRED EMBODIMENTS

The preferred embodiments of the utility model are described below with reference to the accompanying drawings. It shall be understood that the preferred embodiments described herein are for explanatory and illustrative purposes only, and are not intended to limit the utility model.

Embodiments

Figure 1:
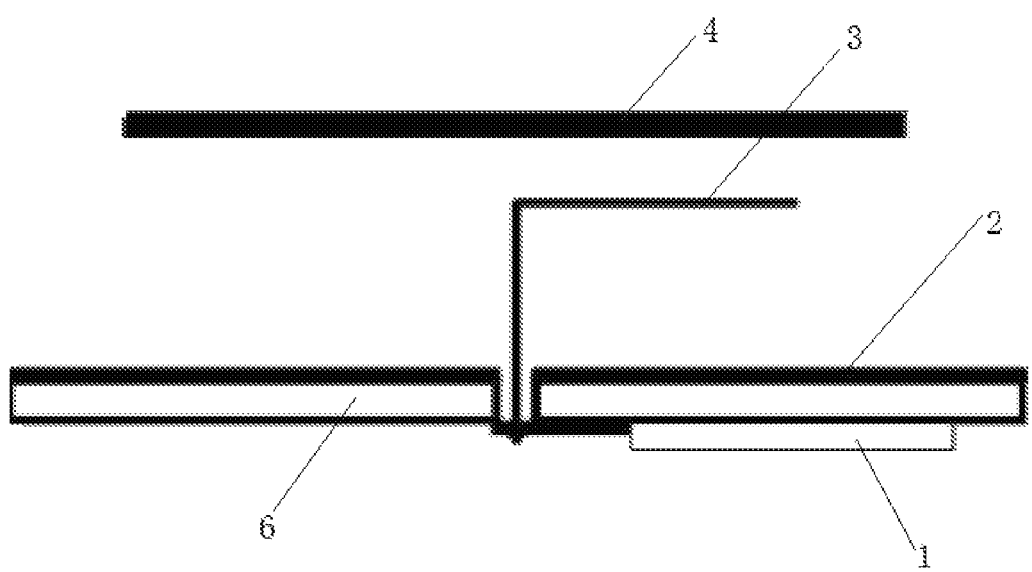
FIG. 1 is a sketch diagram showing the internal structure of casing to a headphone transmitting and receiving signals through a plate antenna with a L-shaped probe according to embodiments of the utility model.
Figure 2:
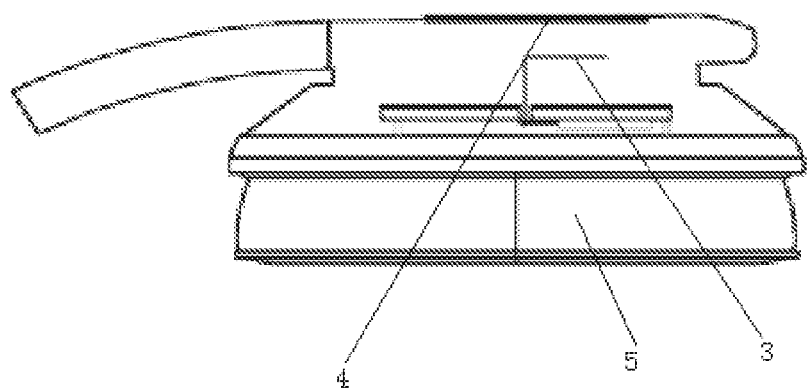
FIG. 2 is a sketch diagram of casing to a headphone transmitting and receiving signals through a feed plate antenna with an L-shaped probe according to embodiments of the utility model.

Please refer to FIGS. 1 and 2. The utility model provides an headphone transmitting and receiving signals through a feed plate antenna with a L-shaped probe, comprising a casing (5), a plate (4), which fixed on the upper part of the casing (5), and can be pasted on the upper part of the casing (5) by adhesive for convenient disassembly and fixing, a wireless circuit board (1), a panel (2), a probe (3), a plate (4), and a PCB (6), all of which are fixed inside the casing (5), making the appearance more attractive. The bottom of the said PCB (6) is provided with a wireless circuit board (1), the said PCB (6) is electrically connected to the probe (3), the top of the said PCB (6) is provided with a panel (2), and the other end of the probe (3) and the plate (4) are electromagnetically coupled. Since the probe (3) has an L shape or a geometrical figure of other structures, it may render different geometric shapes with respect to different designs, and its different characteristic designs may support multiple frequency bands, providing high directivity, so that the headphone product itself transmits and receives signals better. In addition, the antenna may be made part of the appearance, which enables the headphone product itself transmit and receive signals better. As a result, the PCB has more space for circuit design because the antenna has become a part of the appearance. The said plate is a piece of metal sheet.

Finally, it shall be noted that the above description is only a preferred embodiment of the utility model, and is not intended to limit the utility model. Although the utility model has been described in detail with reference to the stated embodiments, for those skilled in the art, it is still possible to modify the technical scheme described in the stated embodiments, or to make an equivalent substitution to some of the technical features. Any modifications, equivalent substitutions, improvements, etc. made within the spirit and scope of the utility model shall be included within the scope of protection of the utility model.

The invention claimed is:

1. A headphone transmitting and receiving signals through a feed plate antenna with a L-shaped probe, comprising a wireless circuit board, a panel, a probe, a plate, and a printed circuit board, wherein the bottom of the printed circuit board is provided with a wireless circuit board, the printed circuit board is electrically connected to the probe, the top of the printed circuit board is provided with a panel, and the other end of the probe is electromagnetically coupled to the plate.

2. The headphone transmitting and receiving signals through a feed plate antenna with an L-shaped probe according to claim 1, wherein the probe has an L shape.

3. The headphone transmitting and receiving signals through a feed plate antenna with a L-shaped probe according to claim 1, wherein the headphone further comprises a casing, and the plate is fixed to the upper part of the casing.

4. The headphone transmitting and receiving signals through a feed plate antenna with an L-shaped probe according to claim 1, wherein the wireless circuit board, panel, probe, and plate and printed circuit board are all fixed inside the casing.

5. The headphone transmitting and receiving signals through a feed plate antenna with a L-shaped probe according to claim 1, wherein the plate is a piece of sheet metal.

* * * * *